(12) United States Patent
Seo et al.

(10) Patent No.: US 12,146,041 B2
(45) Date of Patent: Nov. 19, 2024

(54) MELAMINE-FORMALDEHYDE FOAMS AND MANUFACTURING METHOD THEREOF

(71) Applicant: DONGSUNG CHEMICAL Co., Ltd., Busan (KR)

(72) Inventors: Panseok Seo, Busan (KR); Youngdo Park, Busan (KR); Byungyoun Gwack, Busan (KR); Sunghun Kim, Busan (KR); Gakgyu Choi, Busan (KR)

(73) Assignee: DONGSUNG CHEMICAL Co., Ltd., Busan (KR)

( * ) Notice: Subject to any disclaimer, the term of this patent is extended or adjusted under 35 U.S.C. 154(b) by 128 days.

(21) Appl. No.: 17/680,805

(22) Filed: Feb. 25, 2022

(65) Prior Publication Data

US 2022/0282055 A1    Sep. 8, 2022

(30) Foreign Application Priority Data

Mar. 2, 2021    (KR) .................. 10-2021-0027763

(51) Int. Cl.

| | |
|---|---|
| *C08J 9/14* | (2006.01) |
| *B29C 44/34* | (2006.01) |
| *C08G 12/32* | (2006.01) |
| *C08J 9/00* | (2006.01) |
| *B29K 61/00* | (2006.01) |

(52) U.S. Cl.
CPC ........... *C08J 9/146* (2013.01); *B29C 44/3442* (2013.01); *C08G 12/32* (2013.01); *C08J 9/0033* (2013.01); *B29K 2061/00* (2013.01); *C08J 2361/28* (2013.01)

(58) Field of Classification Search
CPC ............ B29C 44/3442; B29K 2061/00; C08G 12/32; C08J 9/00; C08J 9/0023; C08J 9/0033; C08J 9/141; C08J 9/146; C08J 2201/03; C08J 2203/14; C08J 2205/044; C08J 2361/28; C08L 61/28
See application file for complete search history.

(56) References Cited

U.S. PATENT DOCUMENTS

| 4,039,493 A * | 8/1977 | Schon ................. C08G 12/427 |
| | | 525/517.5 |
| 4,511,678 A * | 4/1985 | Mahnke .................... C08J 9/00 |
| | | 521/131 |
| 2016/0347924 A1 | 12/2016 | Min et al. |
| 2022/0259403 A1* | 8/2022 | Seo ......................... C08L 61/28 |

FOREIGN PATENT DOCUMENTS

| CN | 107522829 B | 8/2019 |
| EP | 3750952 A1 | 12/2020 |
| EP | 4001350 A1 | 5/2022 |
| JP | 2018162407 A | 10/2018 |
| KR | 20130143562 A | 12/2013 |
| KR | 101379479 B1 | 4/2014 |
| KR | 20150051999 A | 5/2015 |
| KR | 20210009537 A | 1/2021 |
| WO | 2014/037233 A1 | 3/2014 |
| WO | 2020040351 A1 | 2/2020 |
| WO | 2021010802 A1 | 1/2021 |

OTHER PUBLICATIONS

Extended European Search Report dated Jul. 21, 2022 issued in EP Application No. 22159406.2, 8 pages.
Office Action dated May 12, 2023 issued in Korean Patent Application No. 10-2021-0027763 , 13 pages.
Office Action dated Nov. 28, 2023 issued in Korean Patent Application No. 10-2021-0027763 , 13 pages.

\* cited by examiner

*Primary Examiner* — John M Cooney
(74) *Attorney, Agent, or Firm* — Scully, Scott, Murphy & Presser, P.C.

(57) ABSTRACT

A melamine-formaldehyde foam manufactured by including a melamine-formaldehyde condensate that has a weight average molecular weight (Mw) in a range of 1000 to 10,000 g/mol, a solid content in a range of 60 to 80 percent by weight (wt %), and a viscosity in a range of 1000 to 10,000, and a method of manufacturing the melamine-formaldehyde foam. The melamine-formaldehyde foam can have a uniform cell structure, while exhibiting excellent mechanical properties such as tensile strength and elongation.

6 Claims, 3 Drawing Sheets

(a)            (b)

(a)            (b)

MELAMINE-FORMALDEHYDE FOAMS AND MANUFACTURING METHOD THEREOF

CROSS-REFERENCE TO RELATED APPLICATION

This application claims priority under 35 U.S.C. § 119 to Korean Patent Applications No. 10-2021-0027763, filed on Mar. 2, 2021, in the Korean Intellectual Property Office (KIPO), the disclosure of which is incorporated by reference herein in their entirety.

TECHNICAL FIELD

The present invention relates to a melamine-formaldehyde foam and a method of manufacturing the same, and more particularly, to a melamine-formaldehyde foam not only having a uniform cell structure but also exhibiting excellent mechanical properties, and a method of manufacturing the same.

DISCUSSION OF RELATED ART

A melamine-formaldehyde foam may be prepared by adding, for example, a surfactant and an additive to a condensate (e.g., fused material) of melamine and formaldehyde, mixing a foaming agent and a curing catalyst therewith, and then irradiating the mixture with microwave energy. Such a melamine-formaldehyde foam forms an open cell and exhibits excellent sound absorption and insulation properties. In addition, the melamine-formaldehyde foam has excellent heat resistance and is widely used as interior materials for construction and transportation.

In order to prepare a melamine-formaldehyde foam having excellent mechanical properties, it is required to prepare a foam having a uniform cell structure. Conventionally, PCT/EP2013/067525 disclosed a method of forming a uniform cell structure by compressing a melamine-formaldehyde foam to break fragile cells, thereby making a cell structure of the melamine-formaldehyde foam uniform. However, such a compression process not only destroys normal cells, but also concentrates stress on the destroyed cell structure, thus resulting in a problem that the mechanical properties of the melamine-formaldehyde foam are degraded.

Accordingly, there is a demand for development of a melamine-formaldehyde foam having a uniform cell structure while having excellent mechanical properties.

SUMMARY

Aspects of embodiments of the present invention are directed to a melamine-formaldehyde foam manufactured by including a melamine-formaldehyde condensate that has a weight average molecular weight (Mw), a solid content, and a viscosity each optimized in a predetermined range, thereby having a uniform cell structure, while exhibiting excellent mechanical properties such as tensile strength and elongation, without a separate compression process.

In addition, aspects of embodiments of the present invention are directed to a method of manufacturing the melamine-formaldehyde foam.

According to an embodiment of the present invention, a melamine-formaldehyde foam is manufactured by including a melamine-formaldehyde condensate that has a weight average molecular weight (Mw) in a range of 1000 to 10,000 g/mol, a solid content in a range of 60 to 80 percent by weight (wt %), and a viscosity in a range of 1000 to 10,000, and a method of manufacturing the melamine-formaldehyde foam.

DETAILED DESCRIPTION

Figure 1:
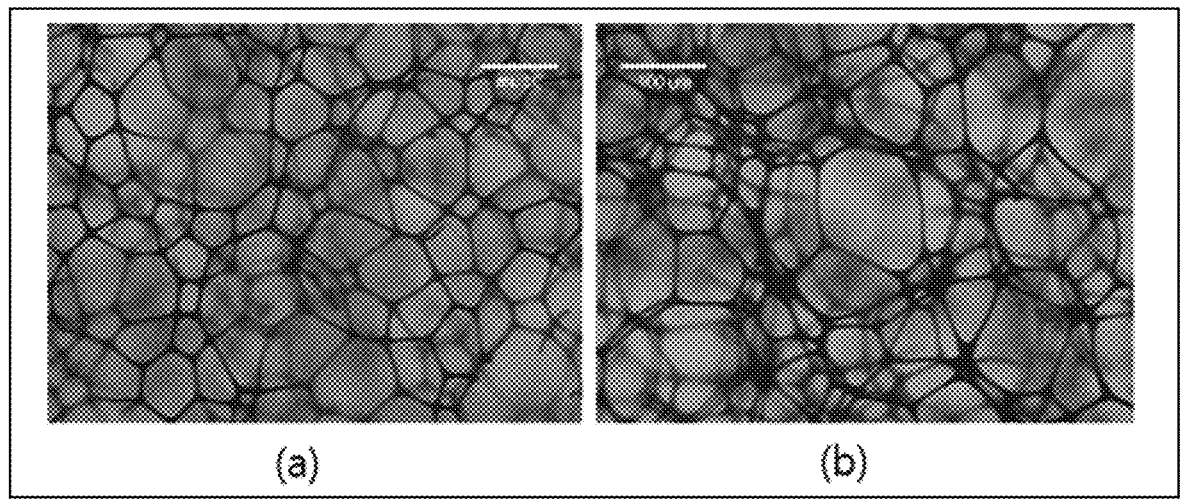
FIG. 1 illustrates cell views illustrating melamine-formaldehyde foams manufactured according to Example 2 and Comparative Example 2.

Hereinafter, the present invention will be described in detail. However, the present invention is not limited only by the following description, and each component may be variously modified or selectively mixed as needed. Accordingly, it should be understood that the present invention includes all modifications, equivalents and substitutes included in the spirit and scope of the present invention.

Unless otherwise defined, all terms (including technical and scientific terms) used herein may be used with the meaning commonly understood by those of ordinary skill in the art to which the present invention belongs. In addition, terms defined in a commonly used dictionary are not to be interpreted ideally or excessively unless clearly defined in particular.

In addition, since the size and thickness of each component illustrated in the drawings are arbitrarily indicated for convenience of description, the present invention is not necessarily limited to the illustrated bar.

In addition, throughout the specification, when a part "includes," "comprises," or "contains" a certain component, it means that other components may be further included, rather than excluding other components, unless otherwise stated.

<Melamine-Formaldehyde Foam>

A melamine-formaldehyde foam according to the present invention is manufactured by including a melamine-formaldehyde condensate that has a weight average molecular weight (Mw) in a range of 1000 to 10,000 g/mol, a solid content in a range of 60 to 80 percent by weight (wt %), and a viscosity in a range of 1000 to 10,000 cps.

According to an embodiment of the present invention, the melamine-formaldehyde foam may include a melamine-formaldehyde condensate formed by a condensation reaction (e.g., fusion reaction) of one or more melamine-based compounds and one or more formaldehyde-based compounds.

As the melamine-based compound, a conventional melamine-based compound known in the art may be used without limitation. For example, one or more melamine-based compounds of melamine, methylolmelamine, alkylated methylolmelamine which is an alkylated product thereof (e.g., methylated methylolmelamine, propylated methylolmelamine, butylated methylolmelamine, isobutylated methylolmelamine and melamine (meth) acrylate) may be used.

As the formaldehyde-based compound, a conventional formaldehyde-based compound known in the art may be used without limitation. For example, one or more formaldehyde-based compounds of formalin, paraformaldehyde, 1,3,5-trioxane, and 1,3,5,7-tetroxocan may be used.

In the above-described condensate of the melamine-formaldehyde compound, a molar ratio (e.g., a mole ratio) of the melamine-based compound and the formaldehyde-based compound is not particularly limited, and may be appropriately adjusted within a range known in the art. For example, a molar ratio of the melamine-based compound and the formaldehyde-based compound may be in a range of 1:1.5 to 4.5, preferably in a range of 1:2.0 to 3.5.

The melamine-formaldehyde condensate may have a weight average molecular weight (Mw) in a range of 1000 to 10,000 g/mol, preferably in a range of 3000 to 8000 g/mol. When the weight average molecular weight of the melamine-formaldehyde condensate is less than 1000, flowability of the melamine-formaldehyde condensate may be degraded due to crystallization of the melamine-formaldehyde condensate, and there may be a problem that mechanical properties of the final melamine-formaldehyde foam are degraded. On the other hand, when the weight average molecular weight of the melamine-formaldehyde condensate exceeds 10,000, there may be a problem that a mixing performance of the melamine-formaldehyde condensate with a foaming agent (e.g., blowing agent), a curing agent and other additives may be lowered, and accordingly, a cell of the melamine-formaldehyde foam may become thicker in thickness to be fragile.

In an embodiment, the melamine-formaldehyde condensate may have a solid content in a range of 60 to 80 wt %. In an embodiment, a viscosity of the melamine-formaldehyde condensate may be in a range of 600 to 10,000 cps, preferably in a range of 1000 to 5000 cps.

Specifically, in order to prepare a melamine-formaldehyde foam having excellent mechanical properties, the viscosity of the melamine-formaldehyde condensate during the manufacturing process should be continuously maintained within a predetermined range. For example, a viscosity of the melamine-formaldehyde condensate at a point in time when 24 hours elapses after manufacturing of the melamine-formaldehyde condensate may be in a range of 600 to 10,000 cps, preferably in a range of 1,000 to 5,000 cps. If the viscosity of the melamine-formaldehyde condensate greatly increases beyond the above-mentioned range during the manufacturing process, kneadability with a curing agent and a foaming agent may be degraded, and there may be a problem that the mechanical properties of the final melamine-formaldehyde foam may be lowered.

As such, when the melamine-formaldehyde condensate according to an embodiment of the present invention satisfies all of the above-described optimum physical property ranges such as the weight average molecular weight, solid content, and viscosity, it may be applicable to a continuous process, while maintaining excellent physical properties.

According to an embodiment of the present invention, a solution including a fluorine-based compound may be added to the above-described melamine-formaldehyde condensate.

The fluorine-based compound serves to improve mechanical properties of the melamine-formaldehyde foam and enhance uniformity of the cell size. In addition, the fluorine-based compound may be added during the manufacturing process of the melamine-formaldehyde foam and may be evaporated in a high-temperature drying process.

As the fluorine-based compound, conventional fluorine-containing compounds known in the art may be used without limitation, and examples thereof may include, for example, an alkoxy group. Specifically, the fluorine-based compound may be alkoxy-fluoroalkane. In addition, a boiling point of the fluorine-based compound may be in a range of 50 to 150° C.

The fluorine-based compound may be used without limitation as long as it may improve the mechanical properties of the melamine-formaldehyde foam and enhance the uniformity of cell size. For example, one or more fluorine-based compounds of methoxy-nonafluorobutane, ethoxy-nonafluorobutane, 1-methoxyheptafluoro propane, methoxynonafluoro butane, 1,1,1,2,2,3,4,5,5,5-decafluoro-3-methoxy-4-(trifluoromethyl)-pentane, 2-trifluoromethyl-3-ethoxydodecofluorohexane, and 1,1,1,2,3,3-hexafluoro-4-(1,1,1,2,3,3-hexafluoropropoxy)-pentane may be used.

A content of the fluorine-based compound may be in a range of 0.01 to 5 parts by weight, preferably in a range of 0.05 to 1 part by weight, with respect to 100 parts by weight of the melamine-formaldehyde condensate.

According to an embodiment of the present invention, the melamine-formaldehyde foam may further include at least one of a condensing agent (e.g., a fusing agent), an emulsifier, a foaming agent (e.g., a blowing agent), and a curing agent.

As the condensing agent, a conventional condensing agent known in the art may be used without limitation, and for example, one or more condensing agents of sodium bisulfite, ammonium sulfamate, and sodium formate may be used. In an embodiment, an amount of the condensing agent added may be in a range of 0.2 to 10 parts by weight, preferably in a range of 1 to 5 parts by weight, with respect to 100 parts by weight of the melamine-formaldehyde condensate. When the amount of the condensing agent added is less than 0.2 parts by weight, a sufficient condensation reaction may not occur, and thus a cell density may be lowered after the foam is formed, thus lowering heat resistance. On the other hand, when it exceeds 10 parts by weight, it may be difficult to control a polycondensation reaction.

The emulsifier may be used to emulsify the foaming agent and to stabilize the foam. As the emulsifier, conventional materials known in the art may be used, and for example, one or more emulsifier mixtures of anionic, cationic and non-ionic surfactants may be used. Specific examples of applicable emulsifiers may include one or more anionic surfactants of alkyl phosphate, polyoxyethylene alkyl phosphate, alkylsulfonate, polyoxyethylene alkyl aryl sulfite, polyoxyethylene alkyl sulfite and sodium dodecylbenzene sulfonate. An amount of the emulsifier added may be in a range of 0.5 to 5 parts by weight, preferably in a range of 1 to 3 parts by weight, with respect to 100 parts by weight of the melamine-formaldehyde condensate. When the amount of the emulsifier added is less than 0.5 parts by weight, it may be difficult to disperse the additive in the condensation product, and when it exceeds 5 parts by weight, there is a problem that a compressive strength of the produced foam may be lowered.

The foaming agent refers to a substance that creates bubbles when being mixed with plastic or rubber. As non-limiting examples of applicable foaming agents, one or more of halogenated hydrocarbons such as trichloromonofluoromethane (F-11), trichlorotrifluoroethane (F-113) and dichlorotetrafluoroethane (F-114); freon (F-141b), pentane, n-heptane, cyclohexane, cyclopentane isopropyl ether may be used. In addition, an amount of the foaming agent used may vary depending on a desired density of the foam. A content of the foaming agent may be in a range of 0.5 to 20 parts by weight, preferably in a range of 5 to 15 parts by weight, with respect to 100 parts by weight of the melamine-formaldehyde condensate. When the content of the foaming agent is less than 0.5 parts by weight, it may be difficult to produce a foam using the condensation product, and when it exceeds 20 parts by weight, the cell density of the foam prepared using the condensation product may be lowered, and the heat resistance properties may be degraded.

The curing agent is used to catalyze a further condensation reaction of a melamine resin. Applicable curing agents may be an inorganic acid, an organic acid, or a mixture thereof, and specific examples of the curing agent may include one or more of sulfuric acid, phosphoric acid, hydrochloric acid, formic acid, benzenesulfonic acid, toluenesulfonic acid, phenolsulfonic acid and xylenesulfonic acid. A content of the curing agent may be in a range of 0.2 to 10 parts by weight, preferably in a range of 0.5 to 5 parts by weight, with respect to 100 parts by weight of the melamine-formaldehyde condensate. When the content of the curing agent is less than 0.2 parts by weight, it may be difficult to form a foam, and when it exceeds 5 parts by weight, a thickness of the foam cell may increase and there is a risk of degrading mechanical properties such as elasticity.

In the present invention, one or more additives commonly used in the art may be further optionally included within a range that does not impair inherent properties of each component. Non-limiting examples of applicable additives may include water repellents, dyes, flame retardants, UV stabilizers, agents for reducing combustion gas toxicity, agents for promoting carbonization, and the like. An amount of the additive used is not particularly limited and may be appropriately adjusted within a range known in the art.

A melamine-formaldehyde foam according to an embodiment of the present invention may have a cell size in a range of 30 to 300 μm, preferably in a range of 50 to 200 μm. In an embodiment, a thickness of a cell may be 10 μm or less, preferably 8 μm or less, and a lower limit thereof is not particularly limited. When the size and the thickness of the cell are within the above-mentioned ranges, it is possible to achieve effects of improving durability of the melamine-formaldehyde foam. In such a case, a standard deviation of the cell size may be in a range of 0 to 40 μm, preferably in a range of 0 to 30 μm. When the standard deviation of the cell size is within the above-mentioned range, the cell size is uniform, and thus mechanical properties are excellent.

In an embodiment, a tensile strength of the melamine-formaldehyde foam according to an embodiment of the present invention may be 110 kPa or more, preferably in a range of 130 kPa to 300 kPa, and an elongation thereof may be 20% or more, preferably in a range of 25% to 100%. When the tensile strength and the elongation of the melamine-formaldehyde foam are within the above-mentioned ranges, excellent elasticity may be realized, and the effect of improving durability may be achieved.

<Method of Manufacturing Melamine-Formaldehyde Foam>

Hereinafter, a method of manufacturing a melamine-formaldehyde foam according to the present invention will be described. However, the present invention is not limited only by the method illustrated below, and steps of each process may be modified or selectively mixed as needed.

An example of a method of manufacturing a melamine-formaldehyde foam may include: (i) condensing one or more melamine-based compounds and one or more formaldehyde-based compounds to form a melamine-formaldehyde condensate ("step S10"); (ii) mixing a solution including a fluorine-based compound to the melamine-formaldehyde condensate and applying a mixture thereof.

Hereinafter, the manufacturing method is divided into each process step and described as follows.

(i) Preparing of Melamine-Formaldehyde Condensate (Hereinafter, "Step S10")

In step S10, one or more melamine-based compounds and one or more formaldehyde-based compounds are subjected to a condensation reaction to form a melamine-formaldehyde condensate.

Since the melamine-based compound and the formaldehyde-based compound are as described above, description thereof will be omitted.

The condensation reaction may be carried out at a temperature in a range of 50 to 95° C. for 1 to 5 hours. When the condensation reaction is carried out within the above-mentioned range, the melamine-formaldehyde condensate desired in the present invention may be obtained. The description of the melamine-formaldehyde condensate is the same as described above.

(ii) Mixing of Solution Including Fluorine-Based Compound and Applying Mixture Thereof (Hereinafter, "Step S20")

Step S20 is a step of mixing a solution including a fluorine-based compound to the melamine-formaldehyde condensate obtained in step S10 described above. In an embodiment of step S20, the solution may further include one or more of a condensing agent, an emulsifier, a foaming agent, and a curing agent.

In step S20, for example, a solution including a fluorine-based compound may be added to the melamine-formaldehyde condensate and dispersed therein, and the mixture thereof may be stirred at high speed, and/or may be kneaded using one or more application jigs of a T-shaped application jig and a bar-shaped application jig. The high-speed stirring may be performed at 1000 to 7000 rpm for 30 seconds to 5 minutes.

In another embodiment of the present invention, step S20 may include applying the melamine-formaldehyde condensate to a horizontally installed conveyor belt using a T-shaped application jig, and may further include kneading the applied product using a bar-shaped mixer.

Figure 4:
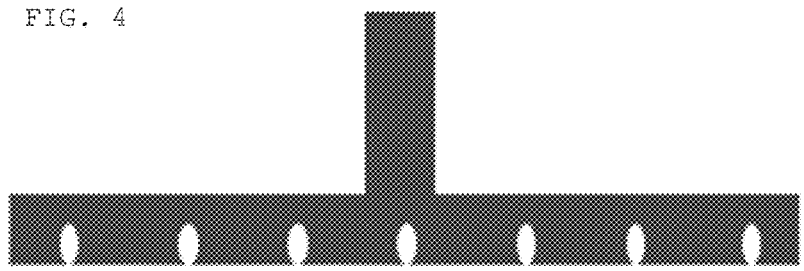
FIG. 4 is a schematic view illustrating a T-shaped application jig.
Figure 5:
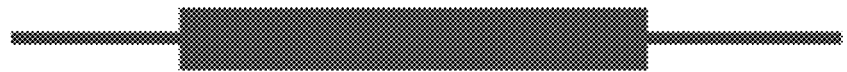
FIG. 5 is a schematic view illustrating a bar-shaped mixer.

In an embodiment of the present invention, the T-shaped application jig may have the shape illustrated in FIG. 4. For example, the T-shaped application jig may have a cylindrical shape having a length in a range of 1000 to 1500 mm, and may include 5 to 20 discharge holes having a diameter in a range of 5 to 20 mm. In order to continuously manufacture a melamine-formaldehyde foam, a melamine-formaldehyde condensate in which the foaming agent, the curing agent, and the additive are kneaded should be uniformly applied into a foaming chamber. When the melamine-formaldehyde condensate that is cured in advance is introduced into the foaming chamber, physical properties of the melamine-formaldehyde foam may be degraded or defects in appearance may occur. On the other hand, in the present invention, the melamine-formaldehyde condensate may be uniformly applied by using the T-shaped application jig.

In another embodiment of the present invention, the method may further include kneading the applied material with a bar-type mixer. The bar-shaped mixer may be, for example, a triangular or square-shaped long bar, but embodiments of the present invention are not limited thereto. The melamine-formaldehyde foam prepared by further including the step of kneading with the bar-shaped mixer may improve cell size uniformity, and thus mechanical properties thereof may be improved.

According to another embodiment of the present invention, the method of manufacturing the melamine-formaldehyde foam may further include drying a product of step S20 at a high temperature. Specifically, the product of step S20 may be irradiated with high frequency to form a foam. In addition, the method may further include a drying process for post-aging the foam after irradiation with high frequency.

The high-frequency irradiation may be appropriately controlled within conditions known in the art for forming a foam. For example, irradiation may be performed using a high frequency wave having a frequency in a range of 0.95 to 7 GHz per 100 g of the solution with an output in a range of 1 to 10 KW to form a foam. Preferably, the foam may be formed by irradiating with an output in a range of 1.5 to 5 KW. The drying process is not particularly limited, and for example, the foam may be stabilized by post-aging at 150 to 250° C. for 1 to 24 hours.

Through the above-described process, a melamine-formaldehyde foam from which fluorine-based compounds, moisture, and formaldehyde are removed may be obtained.

Hereinafter, the present invention will be described in detail through embodiments. However, the following embodiments are only given to illustrate the present invention, and the present invention is not limited by the following embodiments.

[Example 1] Preparation of Melamine-Formaldehyde Foam 126 kg of melamine, 126 kg of a 37% formaldehyde aqueous solution, 47 kg of paraformaldehyde were reacted at 80° C. for 3 hours under a sodium hydroxide catalyst (5N NaOH 0.2 kg) to prepare a melamine-formaldehyde condensate having a molar ratio of melamine of 1 and a molar ratio of formaldehyde of 3. The prepared condensate had a solid content of 73 wt %, a weight average molecular weight of 5000 g/mol, and a viscosity of 2,000 cps.

In the prepared melamine-formaldehyde condensate, 1.5 parts by weight (4.5 kg) of sodium dodecylbenzene sulfonate, 3 parts by weight (9 kg) of sodium formate, 10 parts by weight (30 kg) of n-pentane, 4 parts by weight (12 kg) of formic acid, 1 part by weight (3 kg) of ethoxy-nonafluorobutane, with respect to the total weight of the melamine-formaldehyde condensate, were continuously introduced into an extruder and uniformly mixed. Then, the mixture was continuously introduced into a foaming chamber including, on four sides, a conveyor belt and a magletron by using a T-shaped application jig, while the mixture applied on the moving conveyor belt was uniformly kneaded once again by using a mixer in the form of a long bar. Then, the mixture was irradiated with a 100 KW microwave for 5 minutes to prepare a melamine-formaldehyde foam. Next, the melamine-formaldehyde foam was dried at 200° C. for 2 hours.

[Example 2] Preparation of Melamine-Formaldehyde Foam 126 kg of melamine, 126 kg of a 37% formaldehyde aqueous solution, 47 kg of paraformaldehyde were reacted at 60° C. for 2 hours under a sodium hydroxide catalyst (5N NaOH 0.2 kg) to prepare a melamine-formaldehyde condensate having a molar ratio of melamine of 1 and a molar ratio of formaldehyde of 3. The prepared condensate had a solid content of 73 wt %, a weight average molecular weight of 4,000 g/mol, and a viscosity of 1,900 cps.

In the prepared melamine-formaldehyde condensate, 1.5 parts by weight of sodium dodecylbenzene sulfonate, 3 parts by weight of sodium formate, 10 parts by weight of n-pentane, 4 parts by weight of formic acid, 1 part by weight of ethoxy-nonafluorobutane, with respect to the total weight of the melamine-formaldehyde condensate, were continuously introduced into an extruder and uniformly mixed. Then, the mixture was continuously introduced into a foaming chamber including, on four sides, a conveyor belt and a magletron by using a T-shaped application jig, while the mixture applied on the moving conveyor belt was uniformly kneaded once again by using a mixer in the form of a long bar. Then, the mixture was irradiated with a 100 KW microwave for 5 minutes to prepare a melamine-formaldehyde foam. Next, the melamine-formaldehyde foam was dried at 200° C. for 2 hours.

[Example 3] Preparation of Melamine-Formaldehyde Foam 126 kg of melamine, 126 kg of a 37% formaldehyde aqueous solution, 47 kg of paraformaldehyde were reacted at 85° C. for 3 hours under a sodium hydroxide catalyst (5N NaOH 0.2 kg) to prepare a melamine-formaldehyde condensate. The prepared condensate had a solid content of 73 wt %, a weight average molecular weight of 5,500 g/mol, and a viscosity of 2,100 cps.

In the prepared melamine-formaldehyde condensate, 1.5 parts by weight of sodium dodecylbenzene sulfonate, 3 parts by weight of sodium formate, 10 parts by weight of n-pentane, 4 parts by weight of formic acid, 1 part by weight of ethoxy-nonafluorobutane, with respect to the total weight of the melamine-formaldehyde condensate, were continuously introduced into an extruder and uniformly mixed. Then, the mixture was continuously introduced into a foaming chamber including, on four sides, a conveyor belt and a magletron by using a T-shaped application jig, while the mixture applied on the moving conveyor belt was uniformly kneaded once again by using a mixer in the form of a long bar. Then, the mixture was irradiated with a 100 KW microwave for 5 minutes to prepare a melamine-formaldehyde foam. Next, the melamine-formaldehyde foam was dried at 200° C. for 2 hours.

[Example 4] Preparation of Melamine-Formaldehyde Foam

After the melamine-formaldehyde condensate prepared in the same manner as in Example 1 was stored at 30° C. for 24 hours, a viscosity and a weight average molecular weight were measured. The viscosity was 2200 cps and the weight average molecular weight was 5500 g/mol. Using the melamine-formaldehyde condensate, a melamine-formaldehyde foam of Example 4 was prepared in the same manner as in Example 1.

[Comparative Example 1] Preparation of Melamine-Formaldehyde Foam

A melamine-formaldehyde foam of Comparative Example 1 was prepared in the same manner as in Example 1, except that the reaction was performed at 80° C. for 30 minutes in the preparing of the melamine-formaldehyde condensate.

[Comparative Example 2] Preparation of Melamine-Formaldehyde Foam

A melamine-formaldehyde foam of Comparative Example 2 was prepared in the same manner as in Example 1, except that the reaction was performed at 80° C. for 7 hours in the preparing of the melamine-formaldehyde condensate.

[Comparative Example 3] Preparation of Melamine-Formaldehyde Foam

A melamine-formaldehyde foam of Comparative Example 3 was prepared in the same manner as in Comparative Example 1, except that the T-shaped application jig and the bar-shaped mixer were not used.

[Comparative Example 4] Preparation of Melamine-Formaldehyde Foam

A melamine-formaldehyde condensate was prepared in the same manner as in Comparative Example 1, and after the melamine-formaldehyde condensate was stored at 30° C. for 24 hours, a viscosity was 7000 cps and a weight average molecular weight was 900 g/mol. Using the melamine-formaldehyde condensate, a melamine-formaldehyde foam of Comparative Example 4 was prepared in the same manner as in Example 1.

[Comparative Example 5] Preparation of Melamine-Formaldehyde Foam

A melamine-formaldehyde condensate was prepared in the same manner as in Comparative Example 2, and after the melamine-formaldehyde condensate was stored at 30° C. for 24 hours, a viscosity was 8400 cps and a weight average molecular weight was 17000 g/mol. Using the melamine-formaldehyde condensate, a melamine-formaldehyde foam of Comparative Example 5 was prepared in the same manner as in Example 1.

[Evaluation Example 1] Evaluation of Physical Properties According to Condensation Reaction Time The melamine-formaldehyde foams prepared in Examples 1 to 4 and Comparative Examples 1 to 5 were used to measure physical properties in the following manner.
1. Viscosity
After completion of the melamine-formaldehyde condensation reaction according to Examples and Comparative Examples, a viscosity of the prepared melamine-formaldehyde condensate was measured at 30° C. using a Brookfield Cone type viscometer within 1 hour.
2. Tensile Strength
A tensile strength of the melamine-formaldehyde foam was evaluated according to the test standard ISO 1798. As measurement specimens, 5 specimens were collected using a Type 1A specimen cutting blade and evaluated using UTM equipment.
3. Elongation
An elongation of the melamine-formaldehyde foam was evaluated according to the test standard ISO 1798. As measurement specimens, 5 specimens were collected using a Type 1A specimen cutting blade and evaluated using UTM equipment.
4. Hardness
A hardness of the melamine-formaldehyde foam was measured using a Teclock's durometer of Durometer F0 type.
5. Cell Size and its Standard Deviation
(1) Cell Size (μm)
An average value of 10 random cells was measured at 500× magnification using a BestecVision's XI-CAM digital imaging microscope.
(2) Standard Deviation of Cell Size (μm)
A standard deviation value of the 10 random cells measured by the above method was calculated.
The results are shown in Table 1 below.

TABLE 1

| Category | Examples | | | | Comparative examples | | | | |
| --- | --- | --- | --- | --- | --- | --- | --- | --- | --- |
| | 1 | 2 | 3 | 4 | 1 | 2 | 3 | 4 | 5 |
| Molecular Weight* (g/mol) | 5000 | 4000 | 5500 | 5200 | 700 | 15000 | 750 | 900 | 17000 |
| Viscosity* (cps) | 2000 | 1900 | 2100 | 2200 | 400 | 10000 | 450 | 7000 | 8400 |
| Tensile strength (kPa) | 139 | 139 | 140 | 136 | 105 | 95 | 103 | 85 | 76 |
| Elongation (%) | 36 | 35 | 36 | 37 | 23 | 12 | 26 | 19 | 15 |
| Hardness (F0 Type) | 69 | 70 | 71 | 70 | 60 | 82 | 62 | 84 | 85 |
| Cell size (μm) | 110 | 110 | 115 | 105 | 85 | 75 | 90 | 70 | 65 |
| Standard deviation of cell size | 25 | 24 | 23 | 24 | 29 | 33 | 55 | 42 | 46 |
| Cell thickness (μm) | 7 | 7 | 7 | 7 | 8 | 9 | 9 | 9 | 10 |
| Stain in appearance | No | No | No | No | Yes | Yes | Yes | Yes | Yes |

*means an weight average molecular weight (Mw) and a viscosity of the melamine-formaldehyde condensate.

Figure 3:
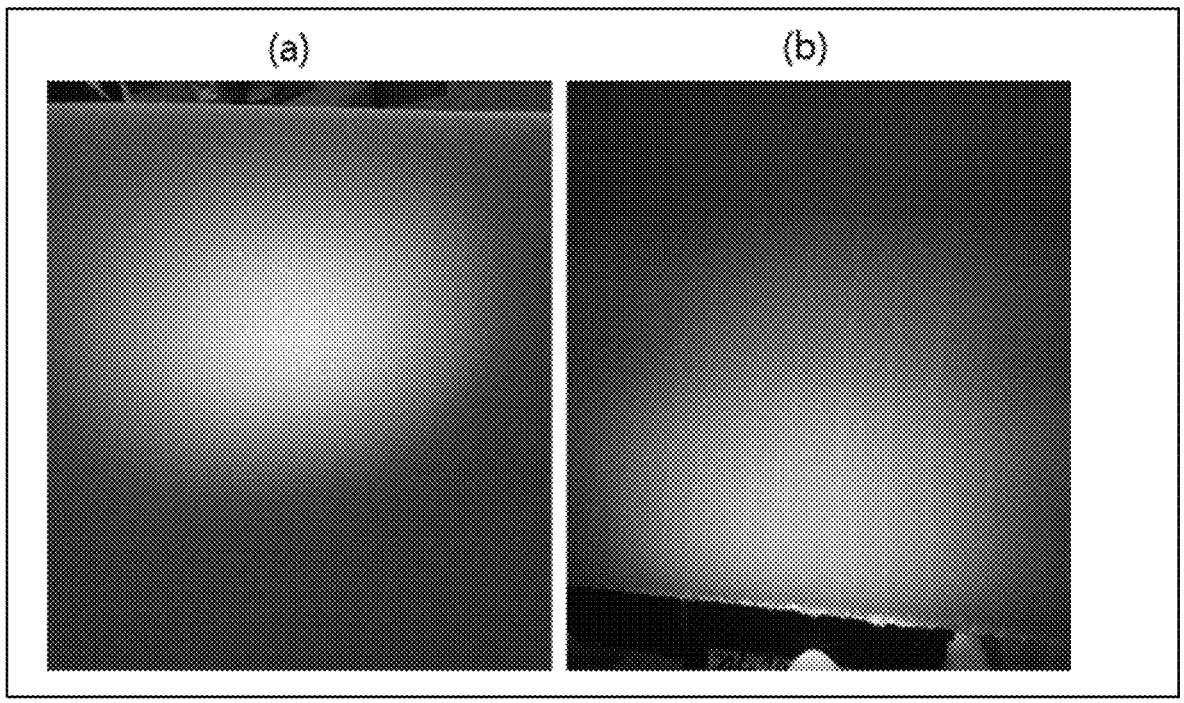
FIG. 3 illustrates cell views illustrating appearance of melamine-formaldehyde foams manufactured according to Example 4 and Comparative Example 4.

As shown in Table 1, it was confirmed that the melamine-formaldehyde condensates according to Examples 1 to 4 had a weight average molecular weight in a range of 4000 to 5500 g/mol and a viscosity in a range of 1900 to 2200 cps. In addition, it was confirmed that the melamine-formaldehyde foams according to Examples 1 to 4 had excellent mechanical properties such as a tensile strength of 136 kPa or more and an elongation of 35% or more. In addition, it was confirmed that the melamine-formaldehyde foams according to Examples 1 to 4 had a uniform cell size with the standard deviation of the cell size in a range of 23 to 25 μm, and were formed without defects in appearance as illustrated in FIG. 3.

[Evaluation Example 2] Cell Photo Evaluation of Melamine-Formaldehyde Foam

Cell appearance photos of the melamine-formaldehyde foams prepared including the melamine-formaldehyde condensates according to Examples and Comparative Examples were evaluated as follows. In such a case, the appearance photo of each melamine-formaldehyde foam was taken with a digital camera.

In FIG. 1, (a) and (b) are cell views illustrating the melamine-formaldehyde foams prepared in Example 2 and Comparative Example 2, respectively.

Figure 2:
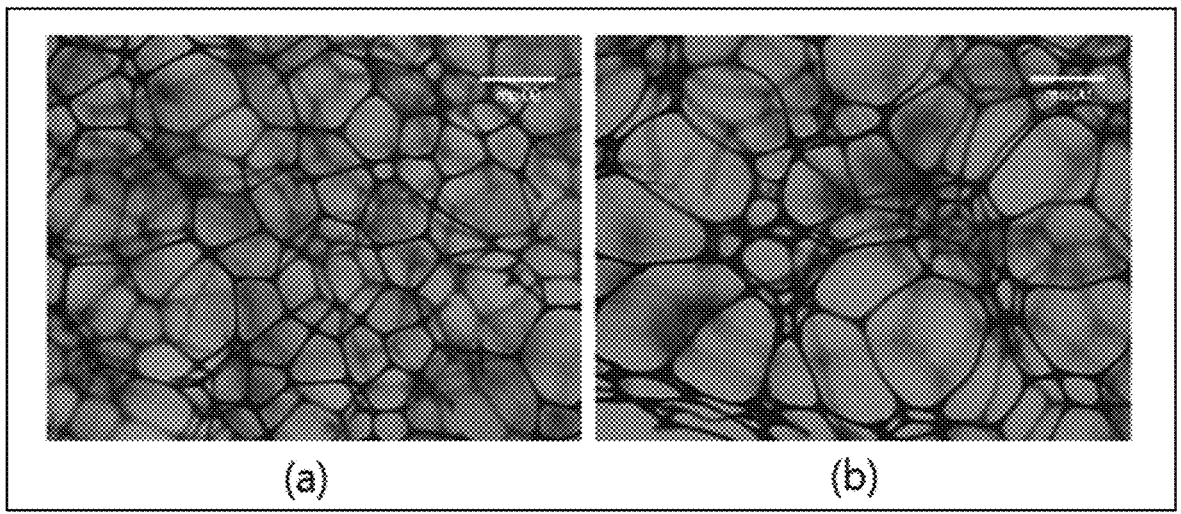
FIG. 2 illustrates cell views illustrating melamine-formaldehyde foams manufactured according to Example 3 and Comparative Example 3.

In FIG. 2, (a) and (b) are cell views illustrating the melamine-formaldehyde foams prepared in Example 3 and Comparative Example 3, respectively.

In FIG. 3, (a) and (b) are cell views illustrating the appearance of the melamine-formaldehyde foams prepared in Example 4 and Comparative Example 4, respectively.

As illustrated in (a) of FIG. 1, it was appreciated that the melamine-formaldehyde foam of Example 2 had a more uniform cell structure than the melamine-formaldehyde foam of Comparative Example 2 illustrated in (b) of FIG. 1.

In addition, as illustrated in (a) of FIG. 2, it was appreciated that the melamine-formaldehyde foam of Example 3 has a more uniform cell structure than the melamine-formaldehyde foam of Comparative Example 3 illustrated in (b) of FIG. 2.

As illustrated in (a) of FIG. 3, it was appreciated that the melamine-formaldehyde foam of Example 4 had a uniform cell size and had a uniform surface without stains in appearance.

On the other hand, as illustrated in (b) of FIG. 3, in the melamine-formaldehyde foam of Comparative Example 4, it was visually confirmed that stains were generated on the surface because the composition was not uniformly mixed.

As such, it was appreciated that a melamine-formaldehyde foam having a uniform structure and excellent mechanical properties such as tensile strength and elongation may be prepared without a separate compression process by including a melamine-formaldehyde condensate having a weight average molecular weight (Mw), a solid content, and a viscosity each optimized in a predetermined range.

As set forth hereinabove, according to one or more embodiments of the present invention, a melamine-formaldehyde foam not only has a uniform cell structure, but also exhibits excellent mechanical properties such as tensile strength, elongation and hardness.

In addition, according to one or more embodiments of the present invention, the melamine-formaldehyde foam may be formed into various materials having excellent properties such as sound absorption and heat resistance.

While the present invention has been illustrated and described with reference to the exemplary embodiments thereof, it will be apparent to those of ordinary skill in the art that various changes in form and detail may be made thereto without departing from the spirit and scope of the present invention.

What is claimed is:

1. A melamine-formaldehyde foam, prepared by comprising a melamine-formaldehyde condensate having:
    a weight average molecular weight in a range of 1000 to 10,000 g/mol,
    a solid content in a range of 60 to 80 percent by weight (wt %), and
    a viscosity in a range of 1000 to 10,000 cps,
        wherein a cell size of the melamine-formaldehyde foam is in a range of 30 to 300 μm,
    a standard deviation of the cell size is in a range of 0 to 40 μm, and
    a cell thickness is 10 μm or less.

2. The melamine-formaldehyde foam of claim 1, wherein a tensile strength is 110 kPa or more, and an elongation (%) is 20% or more evaluated according to test standard ISO 1798.

3. The melamine-formaldehyde foam of claim 1, wherein the melamine-formaldehyde condensate is prepared by a condensation reaction at a temperature in a range of 50 to 95° C. for 1 to 5 hours.

4. A melamine-formaldehyde foam manufactured by a method comprising:
    (i) preparing the melamine-formaldehyde condensate, which has a weight average molecular weight of 1000 to 10,000 g/mol, a solid content of 60 to 80 percent by weight (wt %), and a viscosity of 1000 to 10,000 cps, by condensing one or more melamine-based compounds and one or more formaldehyde-based compounds; and
    (ii) mixing a solution comprising a fluorine-based compound to the melamine-formaldehyde condensate, and then applying a mixture of the fluorine-based compound and the melamine-formaldehyde condensate.

5. The melamine-formaldehyde foam of claim 4, wherein (ii) the applying of the mixture comprises applying the mixture to a horizontally installed conveyor belt by using a T-shaped application jig.

6. The melamine-formaldehyde foam of claim 4, wherein (ii) the applying of the mixture further comprises kneading by using a bar-shaped mixer.

* * * * *